United States Patent [19]

Uno et al.

[11] Patent Number: 5,417,507
[45] Date of Patent: May 23, 1995

[54] VERTICAL MOTOR, METHOD OF MANUFACTURING SAME, POLYGON MIRROR MOTOR USING SAID MOTOR, AND BEARING DEVICE FOR USE IN SAID MOTOR

[75] Inventors: Satosi Uno, Hitachi; Jun Matsubayashi, Naka; Katsutoshi Nii, Hitachi; Kazuhiko Kawaike, Katsuta, all of Japan

[73] Assignee: Hitachi, Ltd., Tokyo, Japan

[21] Appl. No.: 13,353

[22] Filed: Feb. 4, 1993

Related U.S. Application Data

[63] Continuation of Ser. No. 592,328, Oct. 3, 1990, abandoned.

[30] Foreign Application Priority Data

Oct. 7, 1989 [JP] Japan .................. 1-262805
Feb. 9, 1990 [JP] Japan .................. 2-28292

[51] Int. Cl.⁶ .................. F16C 33/82; F16C 32/06
[52] U.S. Cl. .................. 384/107; 384/133
[58] Field of Search .............. 384/100, 107, 114, 119, 384/133, 397; 350/6.8; 310/90, 67 R, 268; 277/80, 135

[56] References Cited

U.S. PATENT DOCUMENTS

| | | | |
|---|---|---|---|
| 4,254,961 | 3/1981 | Fersht et al. | 384/100 |
| 4,691,998 | 9/1987 | Sakagito | 350/6.8 X |
| 4,717,223 | 1/1988 | Ishida et al. | 350/6.8 |
| 4,875,110 | 10/1989 | Kazama et al. | 310/268 X |
| 4,938,611 | 7/1990 | Nii et al. | 384/107 X |
| 4,948,152 | 8/1990 | Kilthau et al. | 277/80 |
| 5,006,765 | 4/1991 | Schmider | 310/67 R X |

FOREIGN PATENT DOCUMENTS 63-1287  1/1988  Japan .
1105015  4/1989  Japan .

Primary Examiner—Thomas R. Hannon
Attorney, Agent, or Firm—Antonelli, Terry, Stout & Kraus

[57] ABSTRACT

There is disclosed a polygon mirror motor in which an annular projection is formed on an upper surface of a rotor support member supporting a polygon mirror, and the annular projection supports a part of a lower surface of the polygon mirror. Radial bearings supporting a shaft of the motor have a plurality of oil grooves extending over about a half of the dimension of the radial bearing in a thrust direction. A magnetic fluid is filled in a space defined by the shaft, a support tube of a bearing support member and the radial bearings.

26 Claims, 7 Drawing Sheets

VERTICAL MOTOR, METHOD OF MANUFACTURING SAME, POLYGON MIRROR MOTOR USING SAID MOTOR, AND BEARING DEVICE FOR USE IN SAID MOTOR

This is a continuation of application Ser. No. 07/592,328, filed Oct. 3, 1990, now abandoned.

BACKGROUND OF THE INVENTION

This invention relates to a vertical motor, a method of manufacturing this vertical motor, a polygon mirror motor using the vertical motor, and a bearing device for use in the vertical motor. The polygon mirror motor constitutes part of a beam scanning system, and is designed to prevent the tilting (i.e., fluctuation) of a surface of the polygon mirror. The vertical motor is designed to achieve a high-speed and high-precision operation of a laser recording device.

Various improvements in recording devices have heretofore been made, and in this connection various improvements in polygon mirror motors have conventionally been made.

As one example of such polygon mirror motors, Japanese Utility Model Examined Publication No. 63-1287 discloses a technique for preventing a mirror surface of a polygon mirror from being soiled with oil droplets scattered from a bearing portion during the rotation of the motor. Namely, when the mirror surface of the polygon mirror becomes soiled or dirty, its reflectance is lowered, and the power of the beam scanning over an object to be scanned (e.g. a photosensitive member) is lowered, which results in a disadvantage that an image is subjected to density unevenness. According to the technique disclosed in the above Japanese Utility Model Examined Publication No. 63-1287, the soiling of the mirror surface of the polygon mirror with the oil droplets scattered from the bearing portion during the rotation of the motor can be prevented.

However, in the conventional polygon mirror motors represented by the one disclosed in the above Japanese Utility Model Examined Publication No. 63-1287, a support member supporting the polygon mirror is held in contact with a lower surface of the polygon mirror over an entire upper surface thereof, and therefore there is much possibility that dust on the order of micron meter is caught in a gap between the entire upper surface of the support member and the lower surface of the polygon mirror. When the polygon mirror motor is assembled with dust (though on the order of micron meter) thus caught in the gap between the polygon mirror and the polygon mirror support member, there is a greater possibility that the surface of the polygon mirror is tilted.

If such surface tilting of the polygon mirror occurs, the position of reflected beam with respect to the object (e.g. a photosensitive material) to be scanned differs from one mirror surface to another to produce pitch unevenness in the image, when the beam emitted from the laser device is reflected by the mirror surface of the polygon mirror, as is well known in the art.

Further, the above Japanese Utility Model Examined Publication No. 63-1287 describes in FIG. 4 a ball bearing device. More specifically, a rotation sensing device is mounted on one end (free end) of a shaft, and a support member comprising a magnet is mounted around the other end of the shaft, and the polygon mirror is mounted on the support member. A drive coil is disposed outwardly of the bearing device to form an outer-rotor type polygon mirror motor having a magnet disposed outwardly of the drive coil.

Another known polygon mirror motor as shown in FIG. 12 is of the sealed type suitable for a highly-clear image processing. In a laser blink, a laser beam from a laser unit comprising a semiconductor laser or a gas laser is reflected by a mirror b of a rotating polygon rotor a to be applied to a back surface of a photosensitive member. The polygon rotor a is rotated by a drive motor c about a fixed shaft d through a sleeve e. A construction similar to this construction is disclosed in Japanese Patent Unexamined Publication No. 1-105015.

A number of dynamic pressure-generating grooves are formed in the outer peripheral surface of the fixed shaft d so as to produce dynamic pressure for bearing a thrust load and a radial load through the rotation of the rotary sleeve e. More specifically, with respect to the function of these dynamic pressure-generating grooves, the dynamic pressure is produced by herringbone-shaped lower grooves f1, intermediate grooves f2 and upper grooves f3 cooperating with the intermediate grooves f2 to provide a herringbone configuration, thereby bearing or supporting the radial load, and also air is fed to the upper surface of the fixed shaft d by the intermediate grooves f2 so as to increase the pressure of the air between the fixed shaft d and a thrust bearing g provided at the upper end of the fixed shaft d, thereby bearing the thrust load.

The polygon rotor a is fixedly mounted on the upper portion of the rotary sleeve e by screws, and a rotary magnet c1 is fixedly mounted on the lower portion of the rotary sleeve, and a stator coil c2 for driving the rotary magnet c1 is fixed in surrounding relation to the rotary magnet c1, thereby constituting the drive motor c. A laser incident window h is formed through an upper portion of a peripheral wall of an outer tube i, this window h allowing the passage of the laser beam to be applied from the exterior to the mirror b of the polygon rotor a, and also allowing the passage of the reflected laser beam to be applied to a desired afterglow surface. Since the polygon rotor a adapted to be rotated at high speeds by the drive motor c is required not only to maintain a high precision of its rotation but also to keep the displacement of the reflecting surface to a minimum, the gap between the fixed shaft d and the rotary sleeve e is quite narrow.

Further, Japanese Patent Unexamined Publication No. 1-105015 discloses a bearing device for use in a high-speed, vertical motor to control the whirl. This publication describes an air bearing having spiral bevel grooves.

The above-mentioned prior art is not intended to achieve a high-speed, high-precision design of the laser recording device, and also has the following problems:

First, since the above conventional motors are outer rotor motors, the inertia of the rotating part is large, and a rise time from the start to a rated rotational speed is long, and it takes long time before a fast recording. Therefore, they are not suited for a high-speed device.

Also, if a ball bearing is used as the bearing, the noise level increases with increase of speed, and a bearing loss occurs due to variations in fretting torque during the rotation of the balls and also due to deterioration of grease. Further, unevenness in rotation occurs due to displacement of the grease, and as the speed becomes higher, the follow-up of control circuitry becomes poorer, thus failing to control the unevenness in rotation of the motor. This results in a problem that a dislocation of vertical line recording is encountered.

These problems can be overcome by the use of an air bearing (as disclosed in the above conventional construction) free from variation in a bearing loss during the operation. However, such a construction is expensive and therefore is not suited for mass-production devices.

Further, since the start frequency lifetime of the air bearing is short, the polygon mirror motor must be kept in a standby condition by a continuous operation thereof. Therefore, the windage loss of the polygon motor as well as the core loss of the iron core increases in proportion to the square of the revolution number. This results in a problem that the operation cost in the standby condition abruptly increases in the case of the high-speed type polygon mirror motor.

Further, the air bearing device has, in addition to the above problems, a problem that its construction is considerably complicated.

SUMMARY OF THE INVENTION

It is a first object of this invention to provide an improved polygon mirror motor which reduces the possibility that the polygon mirror motor is assembled with dust caught in a gap between a polygon mirror and a polygon mirror support member, thereby reducing the possibility of tilting of the polygon mirror surface and also improving the yield of the product.

A second object of the invention is to provide a polygon mirror motor which has a low vibration level, a low noise level and a low degree of unevenness of the rotation as in a motor provided with an air bearing, and has a long ON-OFF durability as in a motor provided with a ball bearing, and is simpler in construction than a motor with an air bearing.

A third object of the invention is to provide a vertical motor suitable for use as a polygon mirror motor or the like.

A fourth object of the invention is to provide a bearing device suitable for use in such motors.

A fifth object of the invention is to provide a method of manufacturing a motor in a simple manner.

According to a first aspect of the present invention, there is provided a polygon mirror motor for rotating a polygon mirror which scans an incident laser beam and emits the scanned laser beam, the polygon mirror comprising a rotor support member supporting the polygon mirror, the rotor support member being held in contact with only a part of the polygon mirror.

According to a second aspect of the invention, there is provided a vertical motor comprising a bearing support member having a support tube; a pair of upper and lower radial bearings provided above and below the bearing support member, respectively; a dynamic pressure seal and a magnetic seal both of which are disposed above the upper radial bearing; a shaft supported by the upper and lower radial bearings and having a projecting portion projecting upwardly through the dymanic pressure seal and the magnetic seal; a rotor support member fixedly secured to the projecting portion and covering the support tube in such a manner as to form a predetermined gap therebetween; a motor magnet mounted on an outer periphery of the rotor support member; a housing fixed to the bearing support member; an iron core having a drive coil and fixedly secured to an inner surface of the housing; a plurality of oil grooves formed in the radial bearings; and a magnetic fluid filled in a space formed by the shaft, the support tube and the radial bearings.

According to a third aspect of the invention, there is provided a method of manufacturing a vertical motor, comprising the steps of: fitting a first radial bearing in a lower portion of a support tube of a first bearing support member; closing a lower end portion of the support tube by a second bearing support member; subsequently pouring a magnetic fluid into the support tube; fitting a second radial bearing and a dynamic seal in an upper portion of the support tube, and attaching a magnetic seal to the dynamic pressure seal to form a bearing unit; fixing a housing, to which an iron core having a drive coil is secured, to the first bearing support member; and inserting a shaft of a rotor into the support tube of the bearing unit.

According to a fourth aspect of the invention, there is provided a polygon mirror motor comprising a bearing support member having a support tube; a pair of upper and lower radial bearings provided on upper and lower portions of the bearing support member, respectively; a dynamic pressure seal and a magnetic seal both of which are disposed above the upper radial bearing; a shaft supported by the upper and lower radial bearings and having a projecting portion projecting upwardly through the dynamic pressure seal and the magnetic seal; a rotor support member fixedly secured to the projecting portion and covering the support tube in such a manner as to form a predetermined gap therebetween; a motor magnet mounted on an outer periphery of the rotor support member; a housing fixed to the bearing support member; an iron core having a drive coil and fixedly secured to an inner surface of the housing; a plurality of oil grooves formed in the radial bearings; a magnetic fluid filled in a space formed by the shaft, the support tube and the radial bearings; a polygon mirror mounted on an upper surface of the rotor support member; and a cover fixedly mounted on the housing to cover the polygon mirror.

According to a fifth aspect of the invention, there is provided a bearing device comprising a bearing support member having a support tube; a pair of upper and lower radial bearings provided on upper and lower portions of the support tube, respectively; a pressure dynamic seal and a magnetic seal which are mounted on the support tube and disposed above the upper radial bearing; a plurality of oil grooves formed in the upper and lower radial bearings; and a magnetic fluid received in a space formed by the support tube and the radial bearings.

According to the present invention, there is little possibility that the polygon mirror motor is assembled with dust caught in a gap between the polygon mirror and the polygon mirror support member which are incorporated in an optical scanning beam system of a recording device. Therefore, the possibility of a surface tilting of the polygon mirror is reduced, thereby improving the yield of the product.

Also, according to the present invention, the polygon mirror motor is of such a construction that the plurality of oil grooves are formed in radial bearings, and a magnetic fluid is filled in a space formed by a shaft, a support tube and the radial bearings, and the polygon mirror is mounted on an upper surface of a rotor support member, and a cover for covering the polygon mirror is fixed to a housing. With this construction, there can be provided a polygon mirror motor which is low in vibration, noise and uneven rotation, and has an increased ON-OFF durability, and is simple in construction.

Further, according to the present invention, a vertical motor is of such a construction that a plurality of oil grooves are formed in the radial bearings, and a magnetic fluid is filled in a space formed by a shaft, a support tube and the radial bearings. With this construction, similar effects as achieved with the above polygon mirror motor can be attained.

Further, according to the present invention, a bearing device is of such a construction that a bearing support member having a support tube is provided, and upper and lower radial bearings are provided on upper and lower portions of the support tube, respectively, and a pressure dynamic seal and a magnetic seal are mounted on the support tube and disposed above the upper radial bearing, and a plurality of oil grooves are formed in the upper and lower radial bearings, and a magnetic fluid is filled in a space formed by the support tube and the radial bearings. With this construction, similar effects as described above can be achieved.

Further according to the present invention, a vertical motor is manufactured by fitting a first radial bearing in a lower portion of a support tube of a first bearing support member; closing a lower end portion of the support tube by a second bearing support member; subsequently pouring a magnetic fluid into the support tube; fitting a second radial bearing and a dynamic seal in an upper portion of the support tube, and attaching a magnetic seal to the dynamic pressure seal to form a bearing unit; fixing a housing, to which an iron core having a drive coil is secured, to the first bearing support member; and inserting a shaft of a rotor into the support tube of the bearing unit. With this method, a vertical motor can be manufactured very easily.

The above objects, construction and advantageous effects will become more manifest upon making reference to the following description.

DESCRIPTION OF THE PREFERRED EMBODIMENTS

The invention will now be described with reference to the drawings.

In each of embodiments of the invention mentioned below, a laser beam emitted from a laser device (not shown) and modulated by a signal to be recorded is incident on a polygon mirror. Also, the laser beam is scanned by rotating the polygon mirror. Further, the laser beam scanned in this manner is incident on a light-receiving drum of a photosensitive member to form a desired image.

Figure 1:
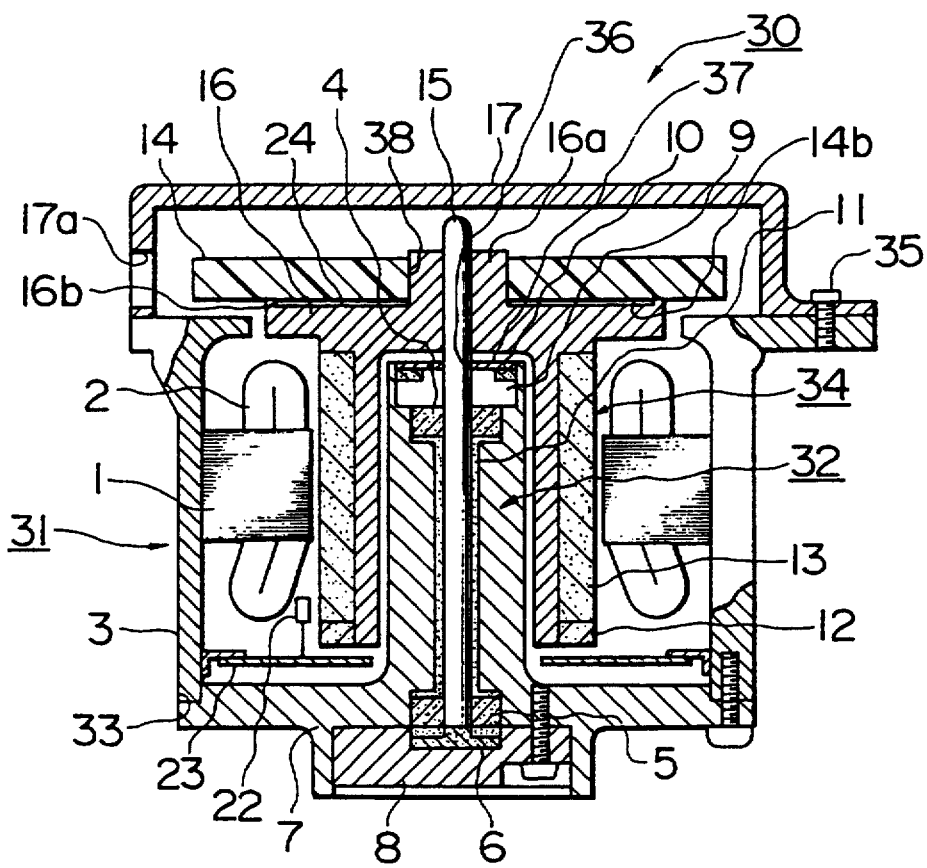
FIGS. 1 to 4 show one embodiment of a polygon mirror motor of the present invention, FIG. 1 being a vertical cross-sectional view of the overall construction of the motor, FIG. 2 being a vertical cross-sectional view showing a condition in which a polygon mirror is connected to a rotor support member, FIG. 3 being a vertical cross-sectional view showing the condition of mounting of a bearing support member, a magnet and a shaft and FIG. 4 being a horizontal cross-sectional view of the bearing support member.
Figure 2:
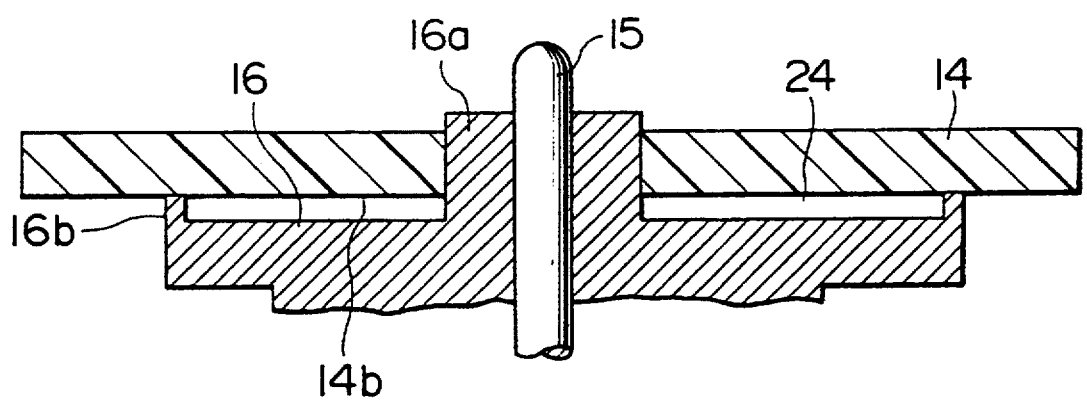
Figure 3:
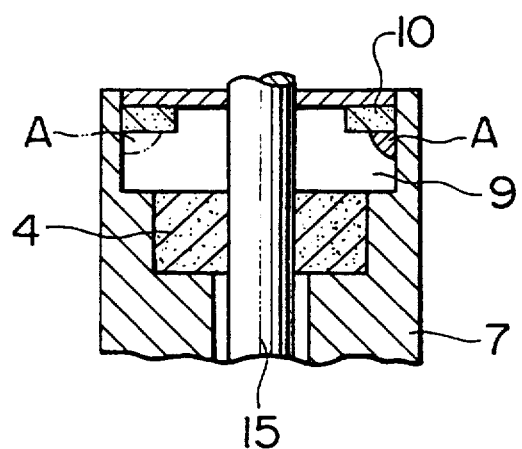
Figure 4:
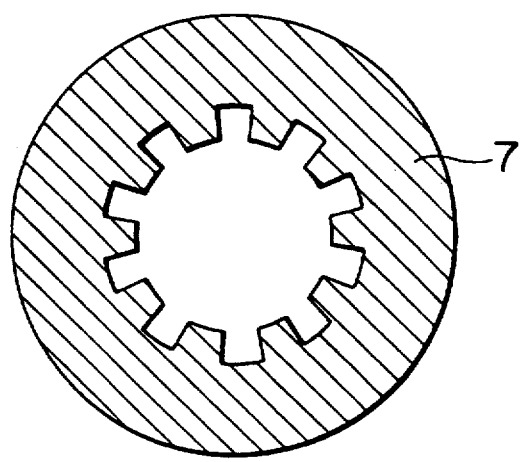

FIG. 1 is a vertical cross-sectional view of a preferred embodiment of a polygon mirror motor of the present invention. FIG. 2 is a vertical cross-sectional view showing a condition in which a rotor support member 16 and a polygon mirror 14 are connected together. FIG. 3 is a vertical cross-sectional view showing the condition of mounting of a bearing support member 7, a magnet 10 and a shaft 15. FIG. 4 is a horizontal cross-sectional view of the bearing support member 7.

As apparent from FIG. 1 showing the overall construction of the polygon mirror motor 30, a drive coil 2 is wound around an iron core 1, and they are mounted on a housing 3 to form a drive coil unit 31. Then, a position sensor 22 and a revolution number sensing coil pattern 23 are arranged as shown in FIG. 1, and further radial bearings 4 and 5 and a thrust bearing 6 are fixed to bearing support members 7 and 8, and the magnet 10 is arranged at the outer portion of an air pocket 9, thereby forming an integral seal-type magnetic fluid bearing unit 32 having a predetermined amount of magnetic fluid 11 poured into the bearing portion. The integral seal-type magnetic fluid bearing unit 32 is mounted or set on one open end 33 of the drive coil unit 31 to form a fixed portion of the polygon mirror motor 30.

Then, a rotation sensing magnet 12, a motor magnet 13 and the polygon mirror 14 are connected by the rotor support member 16 holding a shaft 15, thereby forming a motor rotor 34, and the motor rotor 34 is fitted on the integral seal-type magnetic fluid bearing unit 32 to form the polygon mirror motor 30.

Then, a fully-closing cover 17 having a transparent window 17a is attached to the housing 3 in order to prevent contamination of the polygon mirror 14 and to achieve noise reduction, thus enabling a practical use of the motor.

Each part of the polygon mirror motor 30 will now be described hereinbelow.

As seen from FIG. 1, the polygon mirror motor 30 is broadly divided into the drive coil unit 31, the integral seal-type magnetic fluid bearing unit 32 and the motor rotor 34 with the polygon mirror 14. Therefore, the polygon mirror motor 30 can be assembled merely by passing the rotor shaft 15 through a hole 36, formed through an end plate 37 of the integral seal-type magnetic fluid bearing unit 32, after the integral seal-type magnetic fluid bearing unit 32 is mounted to the drive coil unit 31, and then by fastening the dust/noise insulating cover 17 by screws.

The magnetic fluid 11 of the integral seal-type magnetic fluid bearing unit 32 comprises fine powder of a magnetic material contained in a metal lubricant oil of a low viscosity. Thus, a lubricant of a higher viscosity such as grease for ball bearings is not used, but the liquid lubricant is used, and therefore the load torques of the bearings 4, 5 and 6 are not varied with respect to the rotation of the shaft 15. When the shaft 15 is in a stationary condition, the bearings 4, 5 and 6 are not in direct contact with the shaft 15 as is the case with an air bearing, and the shaft 15 is supported by the bearings 4, 5 and 6 through oil films. Therefore, when starting the motor, the bearings 4, 5 and 6 and the shaft 15 are not subjected to wear, so that the clearance between the shaft 15 and each bearing is not increased, and rotational vibrations and uneven rotation are not increased, thereby enabling a smooth rotation of the shaft 15 over a prolonged period of time. Further, fine powder (whose particle size is, for example, 1 μm) is added to the lubricant oil serving as the magnetic fluid 11, and therefore even if the polygon mirror motor should fall, the magnetic powder is attracted by the plastic magnet 10 mounted on the upper inner peripheral edge portion of the integral seal-type magnetic fluid bearing unit 32, as indicated by the character A in FIG. 3, so that the magnetic powder closes the area of contact between the plastic magnet 10 and the bearing support member 7, thereby preventing the magnetic fluid 11 from leaking from between the two members 10 and 7 to the exterior.

The radial bearings 4 and 5, the thrust bearing 6 and the bearing support members 7 and 8 are made of a material higher in thermal conductivity than the material of the rotor shaft 15. For example, the radial bearings 4 and 5 and the thrust bearing 6 are made of a copper-base material, and the bearing support members 7 and 8 are made of aluminum. Thus, the heat generated at the bearing portion having a clearance of not more than about 5 to 6 μm can be easily radiated to the ambient atmosphere to suppress deterioration of the magnetic fluid 11 due to a chemical reaction as much as possible, in order to achieve a long lifetime of the magnetic fluid.

As shown in FIG. 4, in order to increase the area of absorbing the heat of the magnetic fluid 11 in the integral seal-type magnetic fluid bearing unit 32, the bearing support member 7 has vertical grooves extending along the axis thereof or spiral grooves formed therein. These grooves serve to promote the radiation of the heat of the magnetic fluid 11.

Because of the above construction of the polygon mirror motor 30, it is difficult to pour the magnetic fluid 11 after this motor is assembled. Therefore, in this embodiment, taking into consideration an error in volume or capacity of the integral seal-type magnetic fluid bearing unit 32 which comprises an error in volume of the bearings 4, 5 and 6, a manufacturing error of the bearing support members 7 and 8, and a manufacturing tolerance of the outer diameter of the shaft 15, as well as an increase of the volume of the magnetic fluid 11 due to a thermal expansion thereof and an error in amount of the magnetic fluid 11 as poured, the magnetic fluid 11 is beforehand poured into the magnetic fluid bearing unit 32. Then, the shaft 15 is inserted into the magnetic fluid bearing unit 32. At this time, because of the provision of the air pocket 9, the magnetic fluid 11 is not overflowed to the exterior of the magnetic fluid bearing unit 32, thus preventing the contamination of the polygon mirror 14.

A boss 16a of the rotor support member 16 is shrinkage-fitted in a hole 38 formed through the polygon mirror 14. In the illustrated embodiment, as best shown in FIG. 2, a ring-shaped projection 16b is formed on the upper surface of the rotor support member 16. Namely, an annular recess 24 is formed between the boss 16a of the rotor support member 16 and the ring-shaped projection 16b provided at the outer peripheral portion thereof. Therefore, the rotor support member 16 is held in contact with a lower surface 14b of the polygon mirror 14 only at the ring-shaped projection 16b of a narrow width. This reduces the possibility that the polygon mirror motor is assembled with dust caught between the polygon mirror and the polygon mirror support member, as is the case with the prior art. In other words, as described above, in the conventional polygon mirror motor, the polygon mirror support member is held in contact with the lower surface of the polygon mirror over the entire upper surface thereof, and therefore there is much possibility that dust on the order of micron meter is caught between these two surfaces. When the polygon mirror motor is assembled with dust (though on the order of micron meter) thus caught in the gap between the polygon mirror and the polygon mirror support member, there is a greater possibility that the surface of the polygon mirror is tilted.

If such surface tilting of the polygon mirror occurs, the position of reflected beam with respect to the object (e.g. a photosensitive material) to be scanned differs from one mirror surface to another to produce pitch uneveness in the image, when the beam emitted from the laser device is reflected by the mirror surface of the polygon mirror.

On the other hand, in this embodiment, since the rotor support member 16 is held in contact with the lower surface 14b of the polygon mirror only at the ring-shaped projection 16b of a narrow width, there is little possibility that the polygon mirror motor is assembled with dust caught in the gap between the polygon mirror 14 and the rotor support member 16. Therefore, there is little possibility that the polygon mirror is subjected to surface tilting, thereby improving the yield of the product.

When the diameter of the polygon mirror support surface on the portion 16b of the rotor support portion 16 is 30 mm and 50 mm, a difference in the surface tilting therebetween with dust of 1 μm in thickness deposited on the polygon mirror support surface is 5.5 seconds. A surface tilting standard for a high-precision recording device is about 30 seconds at the maximum, and the surface tilting for currently-available mass-produced devices is about 15 seconds. In view of these, by increasing the diameter of the polygon mirror support surface defined by the ring-shaped projection 16b of the rotor support member 16, the worsening of the surface tilting due to the assembling of the polygon mirror can be effectively suppressed.

Figure 5:
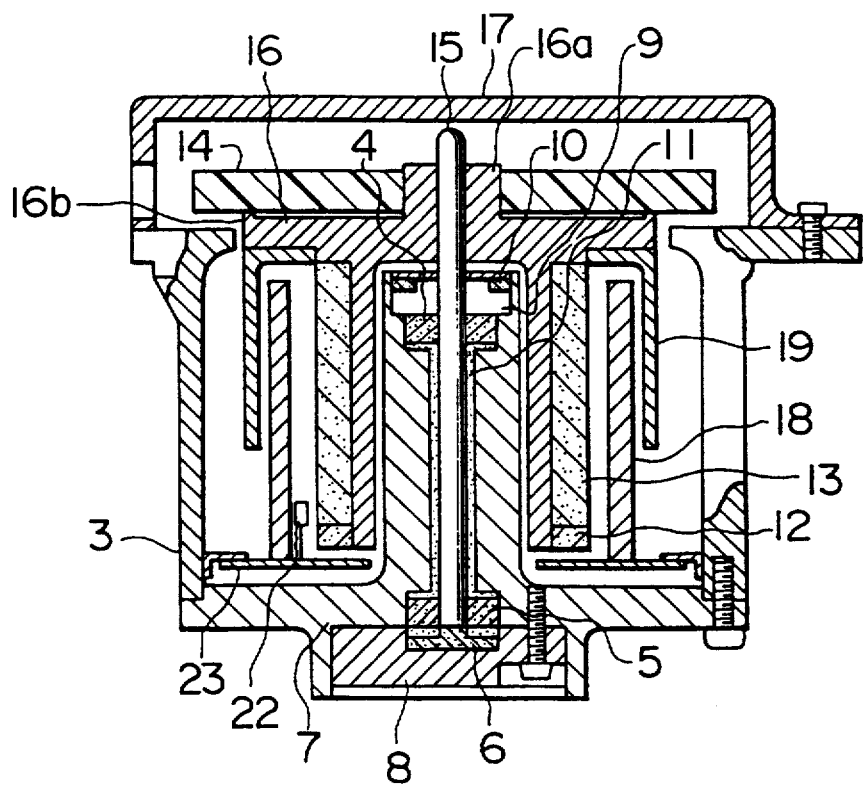
FIG. 5 is a vertical cross-sectional view of a second embodiment of a motor of the invention.

FIG. 5 shows a second embodiment of a motor of the present invention. In this embodiment, a drive coil 18 is of coreless type, and a cylindrical yoke 19 rotatable with a rotor support member 16 is arranged around the drive coil 18. Except for these points, this embodiment is the same as the embodiment of FIG. 1.

A feature of the embodiment of FIG. 5 is that a magnetic field in the yoke 19 is a DC (direct current) magnetic field, so that core loss is not produced. Since this core loss is substantially proportional to the square of the revolution number, the motor loss becomes greater as the rotational speed becomes higher, and an increased temperature rise is encountered. Thus, this is disadvantageous in lifetime, and a burden on a power source become greater. However, this embodiment provides effective means for solving such problems. Also, in the second embodiment, since the yoke 19 rotatable with the rotor support member 16 is provided around the drive coil 18, the drive coil 18 and the yoke 19 cooperate with each other to provide a labyrinth construction as seen from FIG. 5, thereby enhancing the effect of preventing the soiling of a polygon mirror 14 with mists of a bearing oil.

Figure 6:
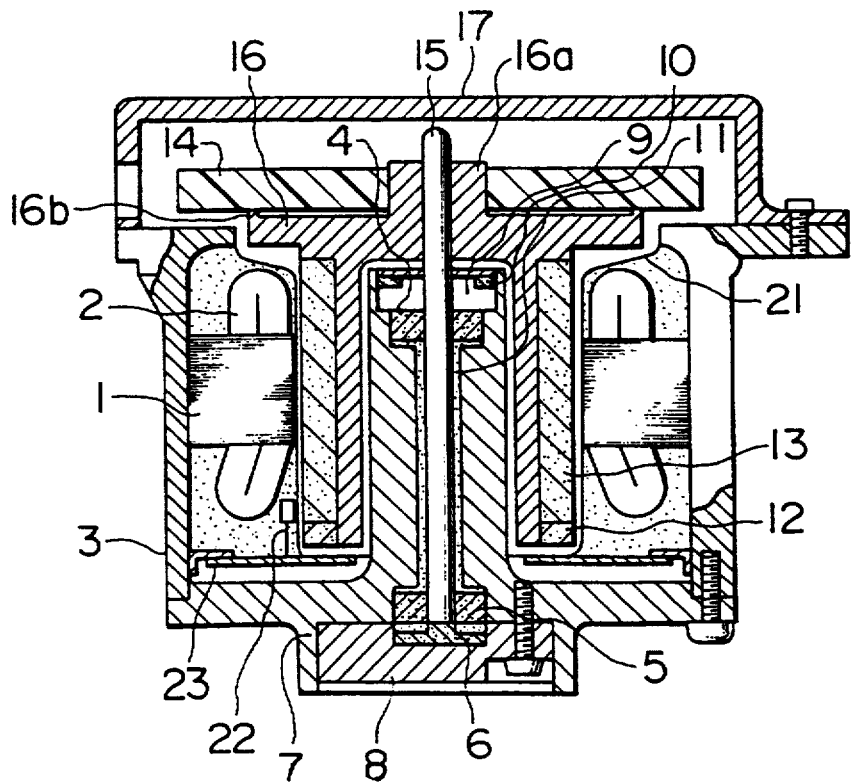
FIG. 6 is a vertical cross-sectional view of a third embodiment of a motor of the invention.

FIG. 6 shows a third embodiment of a motor of the present invention. In this embodiment, a stationary portion of the motor, that is, a motor drive coil unit, is integrally molded to a housing 3 so as to enhance a heat radiating effect, and also to achieve the effect of preventing the contamination of a polygon mirror 14 due to dust which is liable to adhere to an iron core 1 and a drive coil 2.

Figure 7:
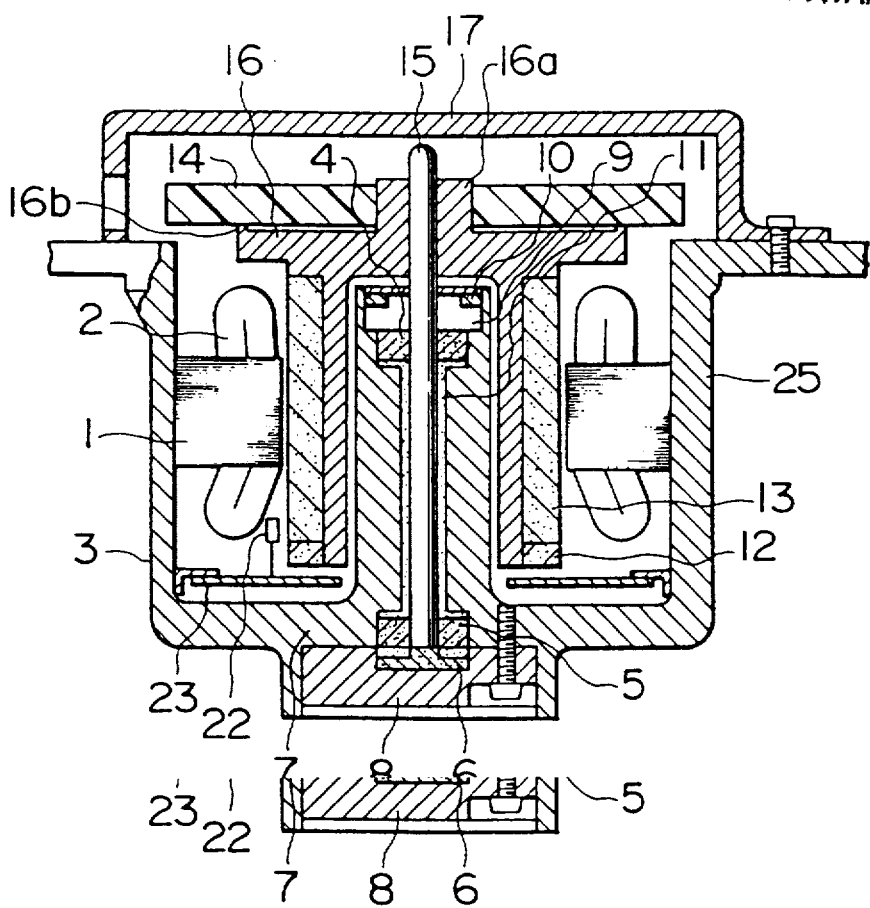
FIG. 7 is a vertical cross-sectional view of a fourth embodiment of a motor of the invention.

FIG. 7 shows a fourth embodiment of a motor of the present invention. In this embodiment, a motor housing 3 and a bearing support member for an integral seal-type magnetic fluid bearing unit are integrally molded with each other to provide a scanner unit 25. In this embodiment, because of the reduction of the number of the component parts, time and labor required for the motor assembling process can be reduced.

Figure 8:
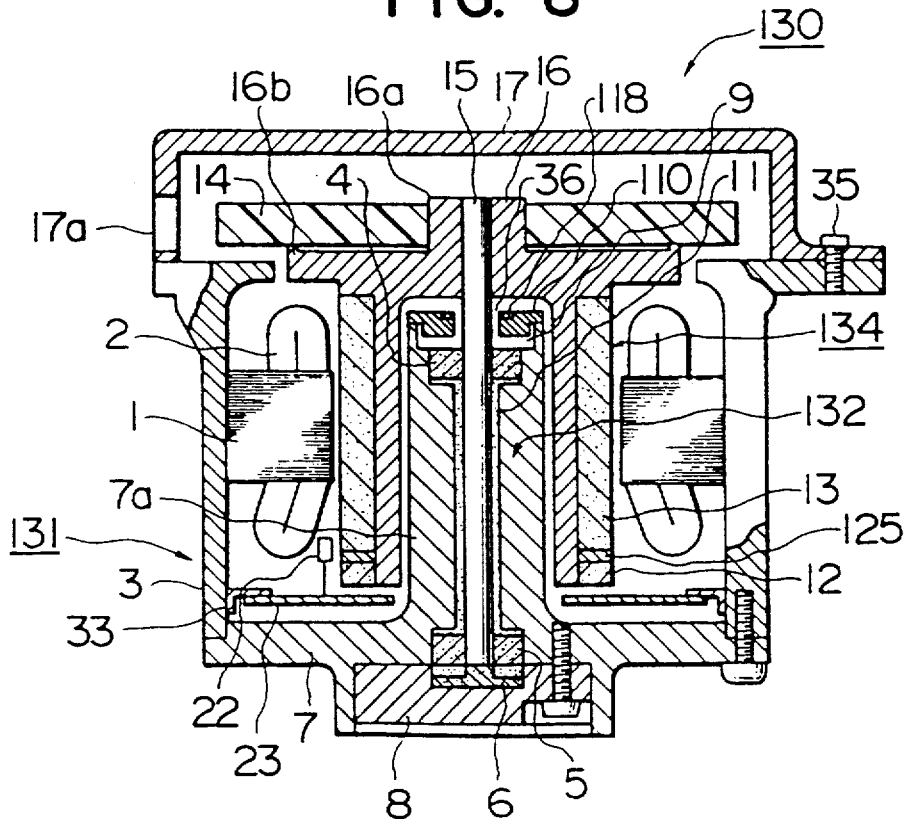
FIG. 8 is a vertical cross-sectional view of another modified polygon mirror motor of the invention.

FIG. 8 shows a fifth embodiment, and those parts of FIG. 8 identical to those of FIGS. 1 to 7 are denoted by identical reference numerals, respectively. In this embodiment, a dynamic pressure seal 110 is arranged at the outside of an air pocket 9, and a magnetic seal 118 is arranged outside of the magnetic seal 118, and an integral seal-type magnetic fluid bearing unit 132 having a predetermined amount of a magnetic fluid 11 poured thereinto is formed. This bearing unit 132 is set or mounted at an open end 33 of a drive coil unit 131 to form a stationary portion of the motor. Reference numeral 7a denotes a support tube formed integral with a bearing support member 7.

As will be appreciated from FIG. 8, the polygon mirror motor 130 is broadly divided into the drive coil unit 131, the integral seal-type magnetic fluid bearing unit 132 and a rotor 134 having a polygon mirror. Therefore, the polygon mirror motor 130 can be assembled merely by passing a shaft 15 of the rotor 134 through a hole 36, formed at one end of the integral seal-type magnetic fluid bearing unit 132, after the integral seal-type magnetic fluid bearing unit 132 is mounted to the drive coil unit 131, and then by fastening a dust/noise insulating cover 17 by screws. Thus, the assembling efficiency is very good.

The magnetic fluid 11 of the integral seal-type magnetic fluid bearing unit 132 is produced adding fine powder (whose particle size is not more than 1 μm) of a ferromagnetic material to a metal lubricant oil of a low viscosity, and then by agitating the metal lubricant oil. The use of the low-viscosity lubricant oil is intended to reduce a loss due to the viscosity, and the ferromagnetic powder is of such size and shape that it will not precipitate in the liquid.

Thus, a lubricant of a high viscosity such as grease for ball bearings is not used, but the liquid lubricant is used, and therefore the load torques of the bearings are not varied with respect to the rotation of the shaft. In a stationary condition of the motor, the bearings are not in direct contact with the shaft as is the case with an air bearing, and the shaft is supported by the bearings through oil films. Therefore, when the motor is turned on and off, the bearings and the shaft are not subjected to wear, and hence the clearance between the shaft and each bearing is not increased, so that rotational vibrations and uneven rotation are not increased, thereby enabling the motor to continue to smoothly rotate.

Figure 9A:
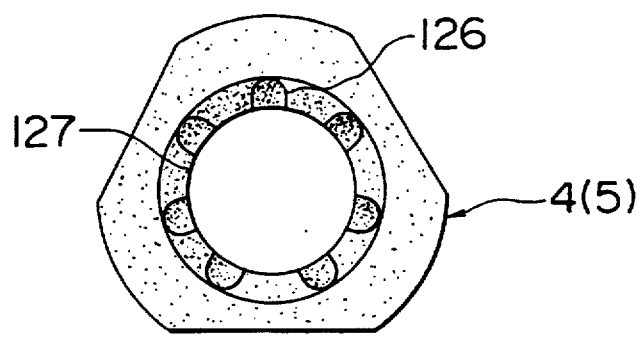
FIGS. 9A, 9B and 9C are views of radial bearings for use in the motor of FIG. 8.
Figure 9B:
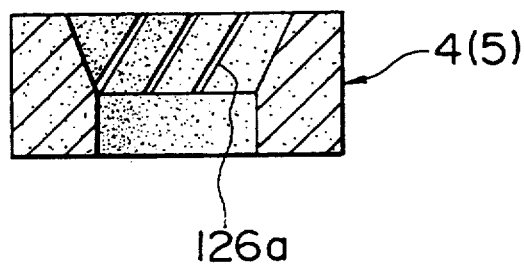
Figure 9C:
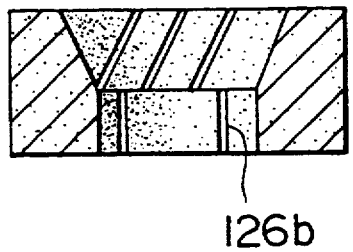

However, oil whirl may develop during a high-speed rotation, and in order to prevent this, a plurality of oil grooves 126 for producing dynamic pressure are formed in radial bearings 4 and 5, as shown in FIG. 9A, so that even when the speed of relative sliding movement between the bearing and the shaft becomes high, the magnetic fluid 11 is drawn or fed to the sliding surfaces, thus ensuring a sufficient feed of the magnetic fluid. Also, as shown in FIG. 9B, instead of the oil grooves 126, spiral oil grooves 126a may be formed in the radial bearings 4 and 5. The direction of the spiral oil grooves 126a is such that the magnetic fluid 11 flows downward in response to the rotation of the shaft 15, thus enabling a smoother flow of the magnetic fluid 11. Further, as shown in FIG. 9C, oil grooves 126b may be formed in the sliding surfaces of the radial bearings 4 and 5, the oil grooves 126 extending in the direction of the axis of the bearing. The oil grooves 126b serve to allow the escape of bubbles produced during a high-speed rotation, thereby preventing the fluctuation of the shaft.

If any one of the radial bearings shown respectively in FIGS. 9A to 9C has an overall height of 4 to 5 mm, the axial length of the cylindrical sliding surface of the bearing needs to have about 2 mm at a revolution number of 20,000 rpm, in order to achieve a stable rotation of the shaft.

The radial bearings 4 and 5 and the thrust bearing 6 are metal bearings made of a copper-base material, and the bearing support members 7 and 8 are made, for example, of aluminum. Thus, the heat generated at the bearing portion having a clearance of about 1 μm to about 6 μm can be easily radiated to the ambient atmosphere to suppress deterioration of the magnetic fluid 11 due to a chemical reaction, in order to achieve a long lifetime of the magnetic fluid.

Because of the above construction of the polygon mirror motor 130, it is difficult to supply the magnetic fluid 11 after this motor is assembled. Therefore, in this embodiment, taking into consideration an error in volume or capacity of the integral seal-type magnetic fluid bearing unit 32 which comprises an error in volume of the bearings 4, 5 and 6, a manufacturing error of the bearing support members 7 and 8, and a manufacturing tolerance of the outer diameter of the shaft as well as an increase of the volume of the magnetic fluid 11 due to a thermal expansion thereof and an error in amount of pouring of the magnetic fluid 11, the magnetic fluid 11 is beforehand supplied into the magnetic fluid bearing unit 32. Then, the shaft 15 is inserted into the magnetic fluid bearing unit 32. At this time, because of the provision of the air pocket 9, the magnetic fluid 11 is not overflown to the exterior of the magnetic fluid bearing unit 32, thus preventing the contamination of the polygon mirror 14.

The magnetic seal 118 and the dynamic pressure seal 110 are formed integral with each other, and are mounted on that portion of the bearing support member 7 disposed outside of the air pocket 9.

Figure 10:
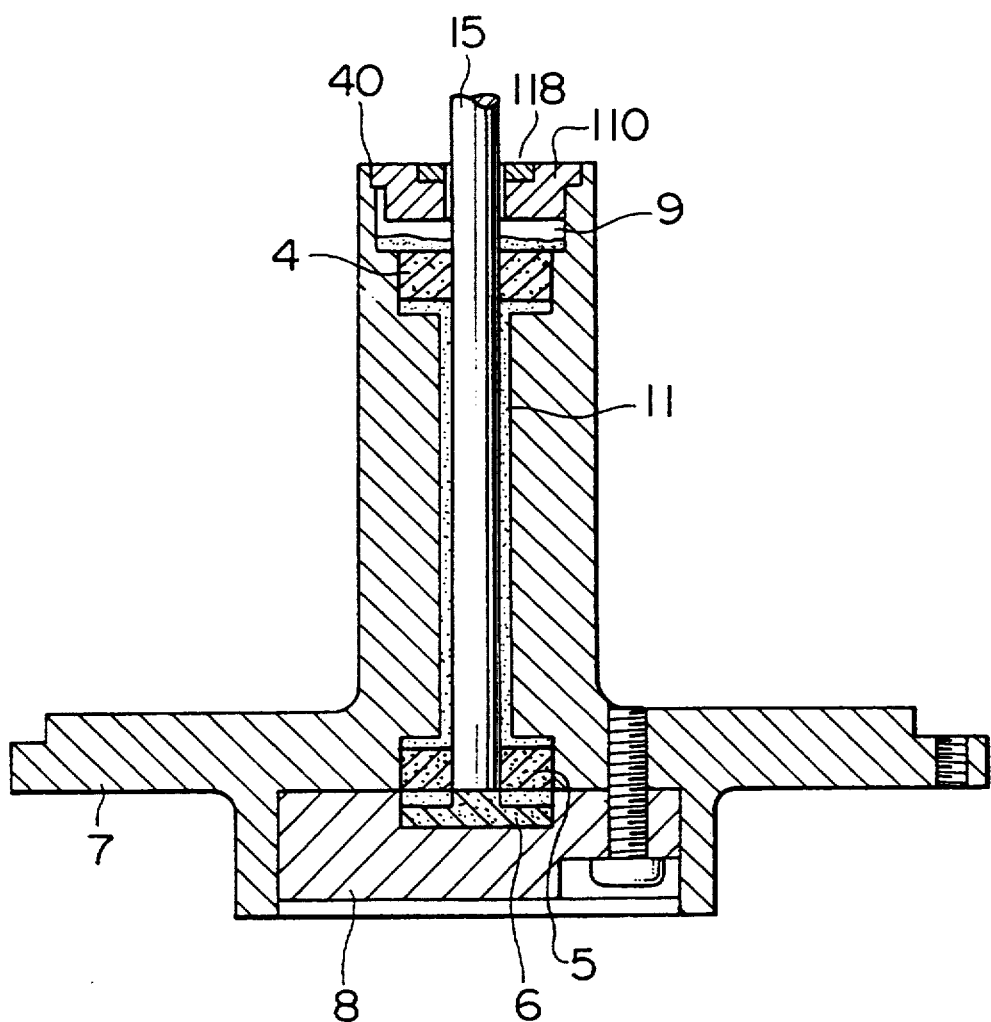
FIG. 10 is a view of bearings and a seal support construction in the motor of FIG. 8.

As shown in FIG. 10, an adhesive 40 or the like is applied between the bearing support member 7 and the dynamic pressure seal 110 to provide a seal therebetween so as to prevent the magnetic fluid 11 from penetrating and leaking, thereby obviating the contamination of the polygon mirror 14.

A projection or boss 16a having the function of fixing the polygon mirror 14 to the rotor support member 16 is formed thereon, and a mechanical fastening of the polygon mirror 14 to the rotor support member 16 is effected by shrinkage-fitting the polygon mirror 14 on the boss 16a. A ring-shaped projection 16b supporting the outer peripheral portion of the polygon mirror 14 is formed on the outer peripheral portion of the rotor support member 16.

In this embodiment, the diameter of the polygon mirror-receiving portion can be increased as compared with the prior art in which a polygon mirror and a polygon mirror support member are fastened together by pressing them into contact with each other by a spring. Therefore, when dust of the same size deposits on the polygon mirror-receiving portion, the worsening is less in this embodiment. Although the diameter of the polygon mirror-receiving portion can be increased in case the fastening is effected by screws, a special configuration must be provided so that the strain due to the screw fastening may not lead to a surface tilting of the polygon mirror. Therefore, this embodiment is advantageous in that the motor can be manufactured at lower costs.

Because of the shrinkage fitting of the polygon mirror 14 on the boss 16a, even when the polygon mirror 14 is inclined under the influence of dust, the polygon mirror 14 and the rotor support member 16 are assembled together, using the central hole of the polygon mirror 14 and the outer diameter of the boss 16a as a reference for the assembling, so that the surface tilting is partly relieved.

In order to relieve the surface tilting caused by deformation of the polygon mirror 14 due to an uneven thermal conduction, the shaft 15 is made of a material such as stainless steel lower in thermal conductivity than the materials for the bearings and the bearing support members, thereby suppressing the transfer of the heat to the polygon mirror.

Generally, a motor magnet 13 and a rotation sensing magnet 12 are secured to the rotor support member 16 by an adhesive. In order to reduce a viscosity load of the integral seal-type magnetic fluid bearing unit 132, it is necessary that the diameter of the shaft 15 be as small as possible.

The revolution number of the motor is 10000 to 30000, and in order to keep the resonance frequency out of agreement with the rotation frequency of the motor, to reduce a rise time and to achieve a balancing, it is not always possible to select materials (for the magnets 12 and 13), of which thermal expansion coefficients are in the neighborhood of each other. Therefore, a ring magnet of a mechanically brittle ferrite base material is bonded to the end face, and the revolution number sensing magnet 12 is bonded via a bonding ring 125, thereby preventing breakage of the revolution number sensing magnet 12 due to the difference in thermal expansion coefficients.

A bearing configuration for preventing oil whirl and oil whip will now be described with reference to the drawings.

FIGS. 9A and 9B show the relation between the configuration of the radial bearing 4, 5 and the position of the oil grooves, and show an example of the bearing having three-cut surfaces at the outer periphery.

As is clear from these Figures, since the outer periphery of the bearing is not circular, a sliding surface 127 is not accurately round or circular, but becomes a deformed cylindrical surface. This is because circulating paths for the magnetic fluid 11 is provided at the outside of the bearing, so that the thickness is uneven.

Therefore, the convex portions as well as the concave portions provided at the outer periphery are spaced 120° from one another, and in order to eliminate this influence, part of the bearing is rendered to have the function of supplying the magnetic fluid 11, and the remainder of the bearing serves to effect the sliding movement. With this arrangement, the magnetic fluid 11 is filled in the sliding surface during the rotation of the motor, thereby stabilizing the rotating shaft to suppress oil whirl. This also prevents oil whip due to an insufficient supply of the fluid caused by the high-speed rotation.

The grooves shown in FIG. 9A and extending in the thrust direction can, of course, be formed by a mold, and the bearing of this construction can be manufactured at considerably lower costs than an air dynamic pressure bearing in which etching grooves are formed in a shaft and which is a high-precision bearing.

Next, the construction of the thrust bearing for preventing the fluctuation of the shaft will now be described.

Figure 11:
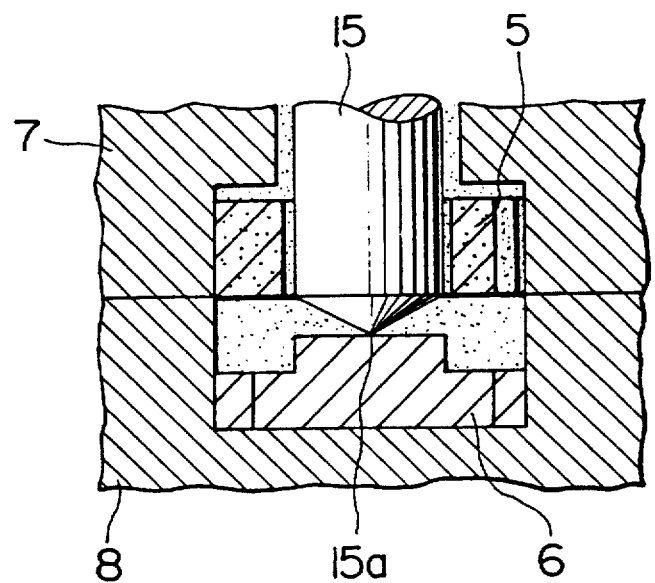
FIG. 11 is a detailed view of a thrust bearing portion.
Figure 12:
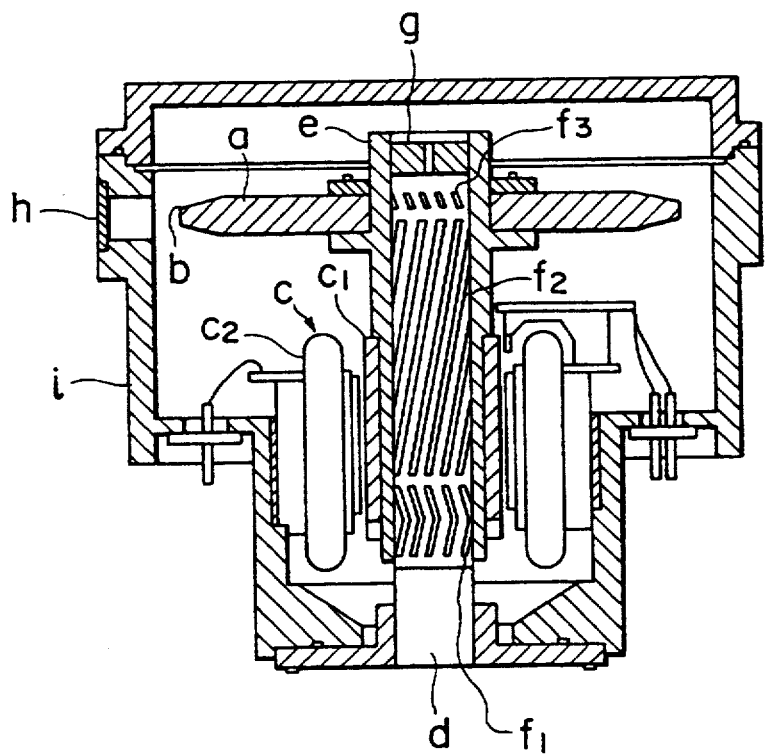
FIG. 12 is a vertical cross-sectional view of the prior art.

The embodiment of FIG. 11 differs from the embodiment of FIGS. 8 and 10 in that a lower end of a shaft 15 is in the form of a cone, so that a rotor support member 16 is supported by a pointed lower end 15a of the shaft 15. The height of the cone is about 1 $\mu$m.

By changing the lower end of the shaft 15 from a surface to the point 15a, an oil film is favorably formed between the entire lower end of the shaft and the thrust bearing 6, and therefore the point 15a of the shaft 15 is prevented from being brought into direct contact with the thrust bearing 6 during the rotation, and also the fluctuation of the shaft 15 can be further reduced. As a result, an error in surface tilting of the polygon mirror 14 is further reduced, thereby enabling the provision of a high-precision laser beam printer.

What is claimed is:

1. A bearing device comprising a bearing support member having a support tube; at least one radial slide bearing provided on said bearing support member; a rotating shaft rotatably supported on the inner periphery of said at least one radial slide bearing and extending outwardly through an outer opening end of said support tube; a magnetic seal and a dynamic pressure seal which surround completely the outer periphery of said rotating shaft, and a magnetic fluid provided to wet a sliding gap between the inner periphery of said at least one radial slide bearing and said rotating shaft and held so as to seal a gap between the outer periphery of said rotating shaft and the inner periphery of said magnetic seal with a magnetic force of said magnetic seal; said dynamic pressure seal being disposed in a manner to form a space between said dynamic pressure seal and an outer end face of said at least one radial slide bearing, and said magnetic seal being disposed on the side of said dynamic pressure seal toward said outer opening end of said support tube.

2. A bearing device according to claim 1, wherein said bearing device is part of a motor, and further comprising a rotor support member fixedly supported on a projecting portion of said rotating shaft which projects outwardly from said support tube through said dynamic pressure seal and said magnetic seal; a motor magnet provided on said rotor support member; a housing fixed to said bearing support member; and an iron core having a motor drive coil and provided on said housing.

3. A bearing device according to claim 2, wherein said motor is a polygon mirror motor, and further comprising a polygon mirror fixedly supported on said rotor support member to reflect an incident laser beam in a scanning manner.

4. A bearing device according to claim 1, wherein said bearing device is part of a motor and further comprising a rotor support member fixedly supported on a projecting portion of said rotating shaft which projects outwardly from said support tube through said dynamic pressure seal and said magnetic seal, said rotor support member being formed to cover said support tube with a gap therebetween; a motor magnet fixedly supported on said rotor support member; a housing fixed to said bearing support member; and an iron core having a motor drive coil and provided on said housing.

5. A bearing device according to claim 4, wherein said motor is a polygon mirror motor and further comprising a polygon mirror fixedly supported on said rotor support member to reflect an incident laser beam in a scanning manner.

6. A bearing device according to claim 1, wherein said at least one radial slide bearing includes a pair of upper and lower radial slide bearings provided on upper and lower portions of said support tube, respectively, said pressure dynamic seal and said magnetic seal being mounted on said support tube and disposed above said upper radial slide bearing, and further comprising a plurality of oil grooves formed in said radial slide bearings.

7. A bearing device according to claim 6, in which said oil grooves are spiral.

8. A bearing device according to claim 6, in which said magnetic fluid comprises lubricant oil and powder of a ferromagnetic material contained in said lubricant oil, said powder having a particle size of not more than 1 $\mu$m.

9. A bearing device according to claim 6, in which when said bearing device is mounted on a shaft, a gap between said radial slide bearings and said shaft is 1 to 5 $\mu$m.

10. A bearing device according to claim 9, further comprising a thrust bearing, a lower end of said shaft being pointed.

11. A bearing device according to claim 1, wherein the outer end face of said at least one radial slide bearing faces said outer opening end of said support tube, said magnetic seal being disposed on the side of said dynamic pressure seal facing away from said space between said dynamic pressure seal and the outer end face of said at least one radial slide bearing.

12. A bearing device comprising a bearing support member having a vertically extending support tube; a radial bearing provided on said bearing support member; a rotating shaft rotatably supported on the inner periphery of said radial bearing and disposed to stand upwardly and outwardly through the upper, outer opening end of said support tube; a magnetic fluid provided to wet a sliding gap between the inner periphery of said radial bearing and said rotating shaft; and a magnetic seal and a dynamic pressure seal which surround completely the outer periphery of said rotating shaft and are mounted on said support tube; said dynamic pressure seal being disposed in a manner to form a space between said dynamic pressure seal and the upper end surface of said radial bearing, said magnetic seal being disposed above said dynamic pressure seal, and said magnetic fluid being put into said space to such a level as to dip the upper end surface of said radial bearing and leave an adequate air reservoir below said dynamic pressure seal.

13. A bearing device according to claim 12, wherein said bearing device is part of a motor, and further comprising a rotor support member fixedly supported on a projecting portion of said rotating shaft which projects outwardly from said support tube through said dynamic pressure seal and said magnetic seal; a motor magnetic provided on said rotor support member; a housing fixed to said bearing support member; and an iron core having a motor drive coil and provided on said housing.

14. A bearing device according to claim 13, wherein said motor is a polygon mirror motor, and further comprising a polygon mirror fixedly supported on said rotor support member to reflect an incident laser beam in a scanning manner.

15. A bearing device according to claim 12, wherein said bearing device is part of a motor and further comprising a rotor support member fixedly supported on a projecting portion of said rotating shaft which projects outwardly from said support tube through said dynamic pressure seal and said magnetic seal, said rotor support member being formed to cover said support tube with a gap therebetween; a motor magnet fixedly supported on said rotor support member; a housing fixed to said bearing support member; and an iron core having a motor drive coil and provided on said housing.

16. A bearing device according to claim 15, wherein said motor is a polygon mirror motor and further comprising a polygon mirror fixedly supported on said rotor support member to reflect an incident laser beam in a scanning manner.

17. A bearing device comprising a bearing support member having a support tube; a pair of radial bearings provided on said bearing support member; a rotating shaft rotatably supported on the inner peripheries of said pair of radial bearings and extending outwardly through the outer opening end of said support tube; a magnetic fluid provided to set sliding gaps between the inner peripheries of said radial bearings and said rotating shaft; one of said radial bearing being disposed next to the upper, outer opening end of said support tube and the other of said radial bearings being disposed to be spaced away from said one of said radial bearings in the axial direction; and a magnetic seal and a dynamic pressure seal which surround completely the outer periphery of said shaft and are mounted on said support tube, said magnetic seal and said dynamic pressure seal being disposed on the side of said radial bearing which is disposed on the side of the outer opening end of said support tube, said dynamic pressure seal being disposed in a manner to form a space between said dynamic pressure seal and the end surface of said radial bearing facing said outer opening end, and said magnetic seal being disposed on the side of said dynamic pressure seal toward said outer opening end.

18. A bearing device according to claim 17, wherein said bearing device is part of a motor and further comprising a rotor support member fixedly supported on a projecting portion of said rotating shaft which projects outwardly from said support tube through said dynamic pressure seal and said magnetic seal; a motor magnetic provided on said rotor support member; a housing fixed to said bearing support member; and an iron core having a motor drive coil and provided on said housing.

19. A bearing device according to claim 18, wherein said motor is a polygon mirror motor, and further,comprising a polygon mirror fixedly supported on said rotor support member to reflect an incident laser beam in a scanning manner.

20. A bearing device according to claim 17, wherein said bearing device is part of a motor and further comprising a rotor support member fixedly supported on a projecting portion of said rotating shaft which projects outwardly from said support tube through said dynamic pressure seal and said magnetic seal, said rotor support member being formed to cover said support tube with a gap therebetween; a motor magnet fixedly supported on said rotor support member; a housing fixed to said bearing support member; and an iron core having a motor drive coil and provided on said housing.

21. A bearing device according to claim 20, wherein said motor is a polygon mirror motor and further comprising a polygon mirror fixedly supported on said rotor support member to reflect an incident laser beam in a scanning manner.

22. A bearing device comprising a bearing support member having a vertically extending support tube; a pair of radial bearings provided on said bearing support member; a rotating shaft rotatably supported on the inner peripheries of said pair of radial bearings and disposed to stand upwardly and outwardly through the upper, outer opening end of said support tube; a magnetic fluid provided to wet sliding gaps between the inner peripheries of said radial bearings and said rotating shaft; one of said radial bearings being disposed next to the upper, outer opening end of said support tube and the other of said radial bearings being disposed downward to be spaced away from said one of said radial bearings in the axial direction; and a magnetic seal and a dynamic pressure seal which surround completely the outer periphery of said rotating shaft and are mounted on said support tube, said magnetic seal and said dynamic pressure seal being disposed on the side of said radial bearing which is disposed on the side of the upper, outer opening end of said support tube, said dynamic pressure seal being disposed in a manner to form a space between it and the upper end surface of said radial bearing which is disposed on the side of the upper, outer opening end of said support tube, said magnetic seal being disposed above said dynamic pressure seal, and said magnetic fluid being put into said space to such a level as to dip the upper end surface of said radial bearing and leave an adequate air reservoir below said dynamic pressure seal.

23. A bearing device according to claim 22, wherein said bearing device is part of a motor, and further comprising a rotor support member fixedly supported on a projecting portion of said rotating shaft which projects outwardly from said support tube through said dynamic pressure seal and said magnetic seal; a motor magnetic provided on said rotor support member; a housing fixed to said bearing support member; and an iron core having a motor drive coil and provided on said housing.

24. A bearing device according to claim 23, wherein said motor is a polygon mirror motor, and further comprising a polygon mirror fixedly supported on said rotor support member to reflect an incident laser beam in a scanning manner.

25. A bearing device according to claim 22, wherein said bearing device is part of a motor and further comprising a rotor support member fixedly supported on a projecting portion of said rotating shaft which projects outwardly from said support tube through said dynamic pressure seal and said magnetic seal, said rotor support member being formed to cover said support tube with a gap therebetween; a motor magnet fixedly supported on said rotor support member; a housing fixed to said bearing support member; and an iron core having a motor drive coil and provided on said housing.

26. A bearing device according to claim 25, wherein said motor is a polygon mirror motor and further comprising a polygon mirror fixedly supported on said rotor support member to reflect an incident laser beam in a scanning manner.

* * * * *